March 13, 1934. H. B. BRAND 1,950,473
APPARATUS FOR PRODUCING FILMS WHICH, ON BEING EXHIBITED,
SHOW STEREOSCOPIC CINEMATOGRAPHIC PICTURES
Filed Oct. 30, 1931
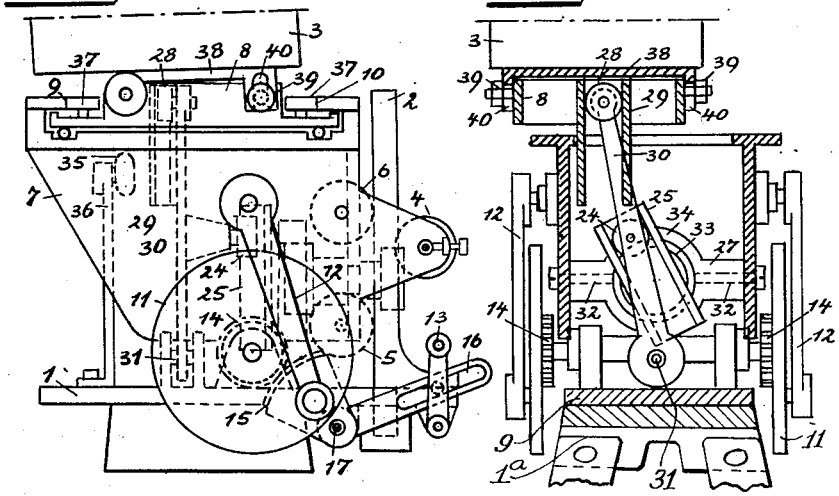
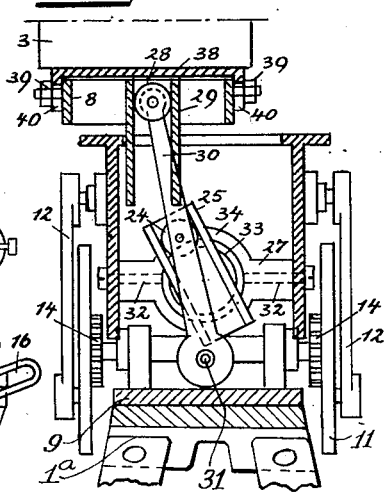
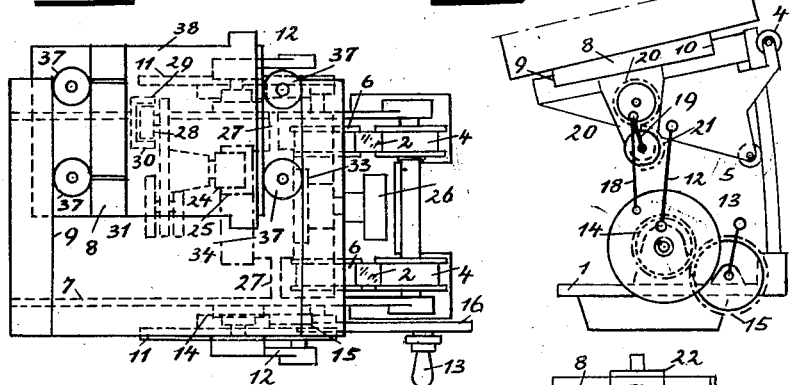
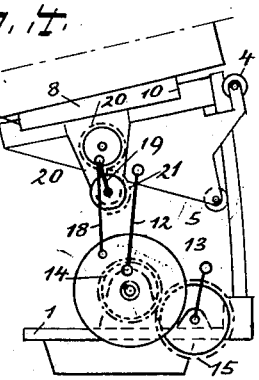
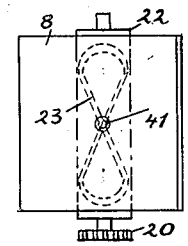
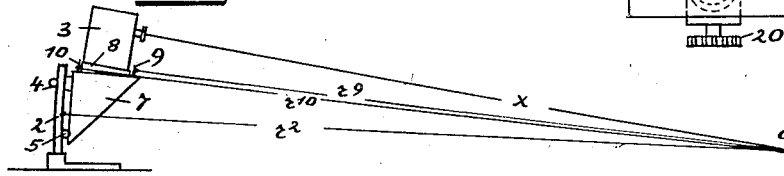

Patented Mar. 13, 1934

1,950,473

UNITED STATES PATENT OFFICE 1,950,473

APPARATUS FOR PRODUCING FILMS WHICH, ON BEING EXHIBITED, SHOW STEREOSCOPIC CINEMATOGRAPHIC PICTURES

Hans Bartolo Brand, Munich, Germany

Application October 30, 1931, Serial No. 572,086

11 Claims. (Cl. 88—16.6)

The object of the invention is to produce an apparatus, which by means of a cinematographic camera allows by means of only one lens of the production of films, which, when exhibited on a screen, produce stereoscopic cinematographic pictures.

According to the invention an apparatus adapted to be placed on a stand is employed, which allows of a continual reciprocating movement to be imparted to the camera along a vertical curved guide during the taking of the photographs, the centre of the curvature of the guide being situated at a point of the object to be photographed and always intersected at this point by the optical axis of the cinematographic camera during the photographing.

For increasing the stereoscopic effect obtainable with this apparatus by moving the cinematographic camera up and down, the apparatus may be further provided with a transverse carriage which participates in the up and down movement and at the same time allows a lateral reciprocating movement to be continually imparted to the camera along a horizontal curved guide. The centre of the curvature of the horizontal guide may coincide with the centre of the curvature of the vertical guide or may lie somewhat before or behind the centre of curvature of the vertical curved guide.

Two embodiments of the invention are illustrated by way of example in the accompanying drawing, in which:

Fig. 1 shows the first form of construction in side elevation.

Fig. 2 is a cross section of Fig. 1 and

Fig. 3 a top plan view of Fig. 1.

Fig. 4 shows the second form of construction in side elevation.

Fig. 5 shows a detail belonging to this second form of construction and

Fig. 6 shows diagrammatically the use of the apparatus.

In both forms of construction vertical curved guides 2 are arranged on a supporting plate 1 adapted to be placed on the camera stand 1a, the centre of the curvature of the guides, as shown in Fig. 6, being situated on a point of the object to be photographed o and, during the taking of the photographs, is continually intersected by the optical axis x of the cinematographic camera 3. A bracket 7 runs with two or three pairs of rollers 4, 5 and 6 on the curved guides 2 and carries the camera 3 either directly or indirectly. The camera 3 is placed directly on the bracket 7, when it is to be moved only up and down during the photographing. If the apparatus is to perform also lateral movements during the taking of the photographs, further a transverse carriage 8 is provided on the bracket 7, on which carriage the camera 3 is fixed. When employing such a transverse carriage 8, it runs on horizontal curved guides 9 and 10, which are mounted on the bracket 7 and the centre of curvature of these guides either coincides, as shown in Fig. 6, with the centre of curvature of the vertical curved guides 2 on the object to be photographed o or is situated either slightly in front or behind same.

A crank arm or crank disc 11 is preferably mounted on each side of the supporting plate 1 for the purpose of moving the bracket 7 up and down, this crank disc being, hingedly connected with the bracket 7 through the intermediary of a crank rod 12. The crank arm or crank disc 11 may be driven by a foot or hand crank 13, which acts on the crank arm or crank disc 11, according to Fig. 4, through the intermediary of an intermediate gearing 14, 15 or, according to Figs. 1 to 3, through the intermediary of a link 16, according to whether a rotary or only an oscillating movement is to be imparted to the arms or discs. The oscillating movement of the crank arm or disc 11 can also be effected by reciprocating the axle 17 of the intermediate gearing 14, 15 in any known manner by means of a lever 13. An oscillating movement may be also obtained in that the axle 17 of the intermediate gears 14, 15 is actuated by means of a lever, substituted for the link 16, this lever being swung up and down for actuating the apparatus. The intermediate gearing 14, 15 may, in the case of only oscillating movement of the crank arms or crank discs 11, consist of a spur wheel 14 and a toothed segment 15 as shown in Fig. 1.

If the apparatus during the taking of the photographs is actuated through the intermediary of the crank arms or crank discs 11, the bracket 7 will be continually moved up and down along the curved guides 2 together with the cinematographic camera 3 during the taking of the film and, owing to the vertical displacement of the lens obtained thereby, a film is produced which, when exhibited on the screen, produces pictures with a good and pronounced stereoscopic effect.

When the apparatus is provided with a transverse carriage 8 to enable also a lateral displacement of the lens as well as the vertical displacement of the same, the reciprocating lateral movement of the transverse carriage 8 along the horizontal curved guides 9 and 10 is derived either from the driving mechanism of the bracket 7 or from the up and down movement of the same. A form of construction of the first type is illustrated in Fig. 4. In this case the crank disc 11 is provided with a second crank rod 18, situated more towards the outer side, which imparts a rotary movement to a transverse spindle 22, separately shown in Fig. 5, through the intermediary of a crank arm 19 and of an intermediate gearing 20, 21. This transverse spindle 22 is provided with an endless cam race 23 in which the transverse carriage 8 runs in known manner by means of a guide pin 41 situated on its underside. Thus, the transverse carriage receives a reciprocating movement in lateral direction when the crank arm or the crank disc 11 is operated, whereas it performs an up and down movement at the same time with the bracket 7. If it is desired to laterally displace the camera only during one of the vertical movements of the bracket 7, for example only during the upward movement thereof, the intermediate gearing may consist of a spur wheel 20 and a semi-circular toothed segment 21, so that during one rotation of the crank arm or crank disc 11 this segment only during one half of its travel exerts a shifting action on the transverse carriage 8. The crank arm or crank disc 11 must for this purpose be rotated, i. e. must not only oscillate.

The derivation of the movement of the transverse carriage 8 from the up and down movement of the bracket 7 is illustrated in the form of construction shown in Figs. 1 to 3.

On the base plate 1 an oscillatable lever 30 is hingedly mounted at 31 and carries a roller 24 running in an inclined U-shaped guide bar 25. This bar is preferably mounted adjustable to different angles of inclination by means of an adjusting disc 26 and adapted to be disengaged by vertical adjustment in a transverse partition 27 of the bracket 7 and, when in inclined position, it effects swinging out of the lever 30 towards each side during the up and down movement of the bracket 7. The upper end of the oscillatable lever 30 carries a roller 28 which runs in a vertical U-shaped catch bar 29 of the transverse carriage 8. Thus, the oscillations of the lever 30 produced by the up and down movement of the bracket 7 are transmitted to the transverse carriage 8 and consequently this carriage 8 is moved to and fro along the horizontal curved guides 9 and 10.

As the length of the actual shifting movement of the transverse carriage 8 is dependent upon the angle of inclination of the guide bar 25, it is possible by suitably adjusting same to bring the lateral movements of the transverse carriage 8 into any desired proportion in amplitude to the vertical movement of the bracket 7 or to disengage same entirely.

The guide bar 25 can be secured in its straight or inclined position by clamping screws 32 adapted to act on a journal 33 by means of which the guide bar 25 is journaled in an eye 34 in the transverse partition 27.

In order to prevent lateral oscillations of the bracket 7 running only on the vertical curved guides 2, the front portion of this bracket can further move along guide bars 36 arranged on each side of the bracket and provided with rollers 35 (Fig. 1). The guiding of the transverse carriage 8 on the horizontal curved guides 9 and 10 may be effected by means of rollers 37.

For adjusting the optical axis x of the camera 3 to the centre of the curvature of the curved guide 2 or of the curved guides 2, 9 and 10, the transverse carriage 8 may further be provided with a cover bar 38 adjustable to an inclined position. The fixing of this cover bar in the actually necessary inclined position may be effected by clamping screws 39 extending through lateral longitudinal slots 40 of the cover bar 38.

The curved guides 2, 9 and 10 are preferably made easily exchangeable in order to enable the same apparatus to be employed for taking photographs at different distances.

I claim:—

1. An apparatus for producing films which, when exhibited, produce stereoscopic cinematographic pictures, comprising in combination a cinematographic camera, a stand for the camera, a supporting plate adapted to be placed on said stand, vertical curved guides on said supporting plate the centre of the curvature of said guides coinciding with a point on the object to be photographed, a bracket adapted to be shifted up and down along said vertical guides and to carry said camera, and means for moving said bracket up and down during the taking of the photographs.

2. An apparatus for producing films which, when exhibited, produce stereoscopic pictures, comprising in combination a cinematographic camera, a stand, a supporting plate adapted to be placed on said stand, vertical curved guides on said plate, a bracket adapted to be shifted up and down on said vertical guides, horizontal curved guides on said bracket the centre of the curvature of said horizontal guides coinciding with the position of the object to be photographed, a transverse carriage adapted to carry said camera and to reciprocate on said horizontal guides, and means for moving said bracket up and down and said transverse carriage backwards and forwards during the taking of the photographs.

3. An apparatus for producing films, which, when exhibited, produce stereoscopic pictures, comprising in combination a cinematographic camera, a stand, a supporting plate adapted to be placed on said stand, vertical curved guides on said plate the centre of curvature of said guides corresponding to the position of the object to be photographed, a bracket vertically shiftable on said vertical curved guides, horizontal curved guides on said bracket the centre of curvature of said horizontal guides being situated in proximity to the position of the object to be photographed in alignment therewith, a transverse carriage adapted to reciprocate on said horizontal guide and to carry said camera, and means for imparting an up and down movement to said bracket and a horizontal reciprocating movement to said transverse carriage during the taking of the photographs.

4. An apparatus for producing films, which, when exhibited, produce stereoscopic pictures, comprising in combination a cinematographic camera, a stand, a supporting plate adapted to be placed on said stand, vertical curved guides on said plate, a bracket adapted to move up and down on said vertical guides, horizontal curved guides on said bracket, a transverse carriage adapted to move backwards and forwards on said horizontal guides, a cover bar on said transverse carriage adapted to be inclined at different angles and to carry said camera, and means for imparting an up and down movement to said bracket and a backward and forward movement to said transverse carriage during the taking of the photographs.

5. In an apparatus for producing films which, when exhibited, produce a stereoscopic effect, the combination of a cinematographic camera, a stand, a supporting plate adapted to be placed on said stand, vertical curved guides on said plate, a bracket adapted to move up and down on said vertical guides, and a crank mechanism on said supporting plate adapted to move said plate up and down during the taking of the photographs.

6. In an apparatus for producing films which, when exhibited, produce stereoscopic pictures, the combination of a cinematographic camera, a supporting plate, vertical curved guides on said supporting plate, a bracket shifting up and down on said vertical curved guides, horizontal curved guides on said bracket, a transverse carriage adapted to be shifted backwards and forwards on said horizontal guides, a spindle having an endless cam race mounted in said transverse carriage, and a crank mechanism mounted on said supporting plate adapted to actuate said spindle and at the same time impart an up and down movement to said bracket during the taking of the photograph.

7. In an apparatus for producing films which, when exhibited, produce stereoscopic pictures, the combination of a cinematographic camera, a supporting plate, vertical curved guides on said supporting plate, a bracket adapted to shift up and down on said vertical guides, horizontal guides on said bracket, a transverse carriage adapted to shift backwards and forwards on said horizontal guides, a spindle with an endless cam race on said transverse carriage, a crank mechanism on said supporting plate adapted to rotate said spindle and impart an up and down movement to said bracket, and an intermediate gearing between said spindle and said crank mechanism adapted to transmit the movement of said crank mechanism to said spindle whilst said bracket is being moved in one direction.

8. In an apparatus for producing cinematographic films which, when exhibited, produce stereoscopic pictures, the combination of a cinematographic camera, a supporting plate, vertical curved guides on said plate, a bracket adapted to be shifted up and down on said vertical guide, horizontal curved guides on said bracket, a transverse carriage adapted to be shifted backwards and forwards on said horizontal guides, a spindle on said transverse carriage having an endless cam race, a crank mechanism on said supporting plate adapted to rotate said spindle and impart an up and down movement to said bracket, an axle of said spindle, a spur wheel on said axle, and a toothed segment of said crank mechanism positively engaging said spur wheel adapted to transmit from said crank mechanism to said spindle whilst said bracket is being moved in one direction.

9. In an apparatus for producing cinematographic films, which, when exhibited, produce stereoscopic pictures, the combination of a cinematographic camera, a supporting plate, vertical curved guides on said supporting plate, a bracket vertically shiftable on said vertical guides, curved horizontal guides on said bracket, a transverse carriage adapted to move backwards and forwards on said horizontal guides, means for moving said bracket upwards and downwards, a mechanism in said means adapted to be automatically actuated by the up and downward movement of said bracket and to effect the reciprocating movement of said transverse carriage.

10. In an apparatus for producing cinematographic films, which, when exhibited, produce cinematographic pictures, the combination of a cinematographic camera, a supporting plate, vertical curved guides on said supporting plate, a bracket adapted to move up and down on said vertical guides, curved horizontal guides on said bracket, a transverse carriage adapted to move backwards and forwards on said horizontal guides, an oscillatable lever mounted on said supporting plate and positively connected to said transverse carriage, means for imparting an up and down movement to said bracket, and an inclined guide bar on said bracket adapted to actuate said lever during the up and down movement of said bracket.

11. In an apparatus for producing cinematographic films, which, when exhibited, produce cinematographic pictures, the combination of a cinematographic camera, a supporting plate, vertical curved guides on said supporting plate, a bracket adapted to move up and down on said vertical guides, curved horizontal guides on said bracket, a transverse carriage adapted to move backwards and forwards on said horizontal guides, an oscillatable lever mounted on said supporting plate and positively connected to said transverse carriage, means for imparting an up and down movement to said bracket, an inclined guide bar on said bracket adapted to actuate said lever during the up and down movement of said bracket, means for adjusting the inclination and rendering inoperative said guide bar, and a scale for indicating the inclination of said guide bar.

HANS BARTOLO BRAND.